United States Patent [19]
Fournier et al.

[11] Patent Number: 5,090,449
[45] Date of Patent: Feb. 25, 1992

[54] COUPLING SECURITY AND SAFETY LATCH SYSTEM

[75] Inventors: Paul J. E. Fournier, Jackson; Randolph L. Maiville, Onondaga; David G. Zander, Jackson, all of Mich.

[73] Assignee: Aeroquip Corporation, Jackson, Mich.

[21] Appl. No.: 634,838

[22] Filed: Dec. 27, 1990

[51] Int. Cl.⁵ ............................................. F16K 31/60
[52] U.S. Cl. ........................... 137/614.05; 137/637.05
[58] Field of Search ............. 137/614, 614.06, 614.05, 137/614.04, 637.05; 251/149.5, 149.9

[56] References Cited
U.S. PATENT DOCUMENTS

| | | | |
|---|---|---|---|
| 974,501 | 11/1910 | Leonard | 251/149.9 |
| 2,770,256 | 11/1956 | Knapp | 137/614.06 X |
| 2,872,216 | 2/1959 | Kaiser | 251/149.9 X |
| 4,438,779 | 3/1984 | Allread | 137/614.06 |

Primary Examiner—Martin P. Schwadron
Assistant Examiner—Kevin L. Lee

[57] ABSTRACT

A security and safety latch system for fluid couplings particularly for fluid couplings utilizing rotatable valves wherein connection and disconnection of the coupling parts is by relative rotation of the parts and the valves are rotated between open and closed positions by exterior manually operated handles. The coupling parts and the valve handles are provided with interfering surfaces which prevent the parts from being relatively rotated and disconnected until both coupling valves are closed. Further, the valve handles are provided with security latches which permit the handles to be locked in the closed position, and prevent the valve handles from being locked in the valve open position.

12 Claims, 7 Drawing Sheets

COUPLING SECURITY AND SAFETY LATCH SYSTEM

BACKGROUND OF THE INVENTION

Fluid couplings comprising interconnectable coupling parts utilize a variety of connecting structure to maintain the parts in a coupled condition. Bolts, nut connectors, quick release sleeves and radially movable detents, and bayonet type connectors are all commonly used with fluid couplings. Often, one or both of the fluid coupling parts include an internal valve for controlling fluid flow through the coupling part and some fluid couplings provide automatic valve operators to open or close the coupling part valves in dependency upon the condition and operation of the coupling connectors. Other couplings employ separately operable valve operators wherein the position of the valve is no operated by the connection or disconnection of the coupling parts.

In fluid couplings having high flow capacity and low pressure loss, and wherein valving in such couplings is desired, ball valves are often used because of their quick operation, high flow capacity and low flow restriction characteristics. Normally, ball valve type fluid couplings employ valve operators exteriorly accessible for positioning the valves as desired. Also, with manually operated ball valve couplings it is also known to employ interlock mechanism between the coupling part connectors and the valve operators to prevent the valve parts from being disconnected if one or more of the valves are in an open, or partially open, condition. The assignee's U.S. Pat. No. 4,438,779 discloses a coupling of this type.

Because of the size of the ball valve in ball valve type fluid couplings, heretofore, ball valve couplings have not been available which are of the low-spill type, i.e. minimal loss of fluid occurs as the coupling parts are separated after the valves have been closed. Those known ball valves having interlock structure between the coupling part connectors and the valve operators have not been of the low-spill type and a need exists for fluid couplings which produce minimal fluid loss upon disconnection of the coupling parts and wherein coupling part disconnection can only occur if the valves are fully closed. Environmental requirements dictate such characteristics.

OBJECTS OF THE INVENTION

It is an object of the invention to provide a security and latch system for low-spill valved fluid couplings wherein connected coupling parts can only be disconnected when the valves of the coupling parts have been rotated to the valve closed condition.

Another object of the invention is to provide a safety disconnect system for valved fluid couplings wherein the coupling parts are interconnected by connectors requiring partial relative rotation between the parts, and such rotation cannot occur until the coupling part valves have been manually closed.

A further object of the invention is to provide a security system for fluid couplings having manually operated valves and wherein the valve parts are disconnected by relative rotation about the parts' axes wherein the coupling parts and the valve operating handles include mutually interfering portions which prevent coupling part rotation and disconnection unless the parts' valves are in the off condition.

An additional object of the invention is to provide a fluid coupling utilizing valved coupling parts wherein the valves are operated by exterior handles, and security latches are mounted upon the handles permitting the handles to be locked in the valve closed position and preventing locking of the handles in the valve open position.

Yet a further object of the invention is to provide a security system for ball type fluid couplings having manually operated valves wherein the coupling parts and valve operating handles include interfering portions requiring approximately 90° rotation of the valve handles to remove the interfering coupling part and valve handle portions to achieve the desired sequence of coupling operation.

Another object of the invention is to provide a security system for fluid couplings having valves rotated by manually operated handles wherein the handles include security latches associated with detent notches formed on the coupling parts, the latches being lockable into the notches at the valve closed positions by the use of a padlock, while the latches are so constructed as to not be lockable when the valve handle is in the valve open position.

SUMMARY OF THE INVENTION

Preferably, the security and latching system of the invention is utilized with fluid couplings having ball type valves. The valves are rotatable about an axis perpendicular to the coupling part flow passage and a 90° valve rotation will rotate the valve between fully opened and fully closed conditions.

The coupling parts use bayonet type connectors wherein axially extending fingers mounted upon the coupling connection end of the coupling parts cooperate with recesses defined in the coupling connection end of the opposite coupling part. The coupling parts are coaxially aligned, the fingers, which include hooks, are inserted into the recesses of the other coupling part, and a partial relative rotation between the coupling parts about their aligned axes lock the fingers and associated hooks in the recesses. With this type of intercoupling part connection the coupling parts may be identical, which significantly reduces inventory, expenses, and matching requirements and such "unisex" couplings have been popular in a wide variety of fluid coupling applications. Such a coupling is shown in the assignee's U.S. Pat. No. 4,438,779.

With fluid couplings of the aforementioned type ball valves may be employed therewith as shown in the identified patent. Such ball valves are operated by exteriorly mounted manually operated handles which rotate in a plane generally tangential to the outer configuration of the associated coupling part.

In the invention the exterior surface of the coupling parts include configurations which will interfere with extensions formed on the valve operating handles if the coupling parts are interconnected and the valves are open. Such interfering surfaces on the exterior of the coupling parts are in the form of flats defined on a coupling part boss adapted to lie in a plane substantially parallel to the plane of movement of the valve operating handle of the other coupling part. The valve operating handles include an outer portion adapted to be grasped and manipulated by the operator, and the inner end of the handle includes an arcuate extension adapted to overlie the potentially interfering surface defined upon the other coupling part. The handle inner end extension defines an interfering surface adapted to engage with the boss surface of the other part if the coupling parts are rotated, and the arcuate extension located at the terminus of the inner end is of a circular configuration substantially concentric to the axis of valve handle rotation and is of such circumferential length as to overlie the other coupling interfering surface until the valve has been rotated to a fully closed condition.

In operation, the coupling parts will be aligned, the fingers and recesses joined, and the coupling parts rotated to properly interconnect the coupling parts. The bosses defined upon the exterior of the coupling parts are so oriented to the connector fingers and recesses that the flat surfaces formed on the coupling part bosses are substantially coplanar when the coupling parts are fully connected. The shafts operating the coupling part valves perpendicularly extend through the boss surfaces and the valve operating handles will move through a plane of operation perpendicular to the valve shafts and parallel to the interfering surfaces defined upon the coupling part bosses.

The inner surface of the handle flat inner end extension is only slightly spaced from the associated flat boss surface and when the valve operating handle is rotated to the open position the valve handle's extension will swing over the flat boss surface of the connected coupling part in a close but non-interfering manner. However, if it is attempted to rotate the coupling parts in a disconnection direction relative to each other the boss surfaces will interfere with the handle extensions and further relative rotation between the coupling parts in a disconnect direction is prevented. The valve handles must be rotated to the valve closed position which clears the handle' inner end extensions from the connected coupling part before the coupling parts can be relatively rotated and disconnected.

As the handle extensions are of an arcuate configuration substantially concentric to the axis of valve handle rotation the extensions are so dimensioned as to continue to overlie the interfering boss surface of the connected part until the valve is rotated to the fully closed condition.

A security latch is pivotally mounted in each of the valve operating handles and is spring biased in a direction which will permit the latch to enter a detent notch formed in a coupling part boss when the valve handle is in the closed position. When the security latch is located within the detent notch it is permitted to rotate sufficiently to fully expose a padlock shackle receiving opening whereby insertion of a padlock shackle will prevent sufficient rotation of the latch to clear the boss notch and prevent the handle from being rotated to the valve open position. The padlock shackle must first be removed from the latch to permit the valve to be rotated to the open condition.

When the valve handle is rotated to the open position engagement of the latch occurs with a second notch defined in the associated coupling part boss, but the second notch is only deep enough to function as a valve open positioning detent but is not deep enough to permit the latch to pivot sufficiently to expose the shackle opening to receive a padlock shackle, and accordingly, it is not possible to lock the valve handle in the valve open condition.

Fluid coupling security and safety latch apparatus in accord with the invention is simple in construction and fabrication, and dependable in operation. The relative conditions of the coupling parts and valve operating handles is readily visibly discernible and the condition of the coupling may be quickly assessed by the operator.

BRIEF DESCRIPTION OF THE DRAWINGS

The aforementioned objects and advantages of the invention will be appreciated from the following description and accompanying drawings wherein.

DESCRIPTION OF THE PREFERRED EMBODIMENT

The security and safety latch system of the invention is of particular advantage as used with low-spill ball valve type couplings and is described as used with such a coupling. The described coupling is also disclosed in the assignee's copending application Ser. No. 07/634837 filed on Dec. 27, 1990.

Figure 1:
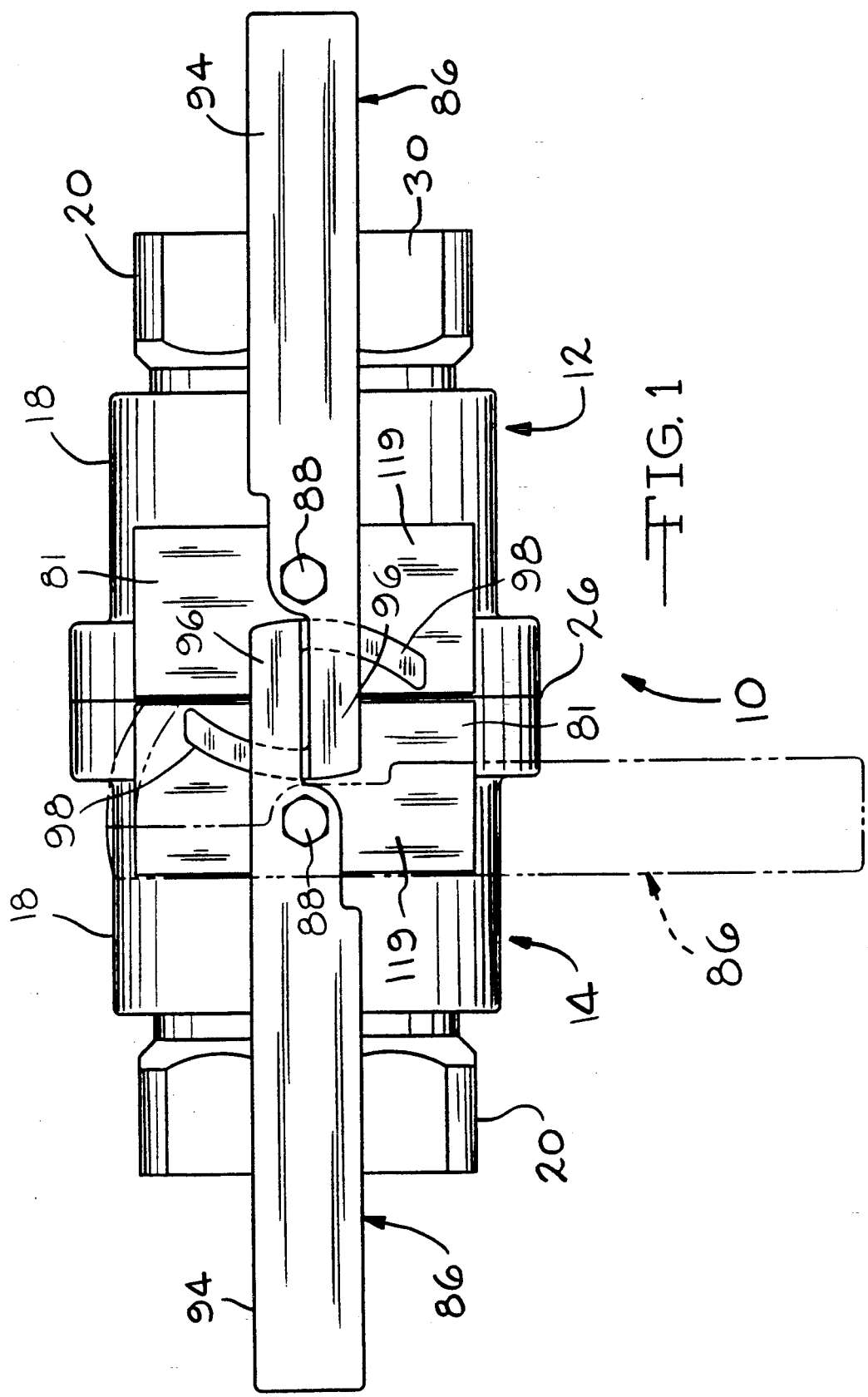
FIG. 1 is a top plan view of a fluid coupling constructed in accord with the invention illustrating the coupling parts in interconnected relationship, the valve handles being of the basic embodiment form without a security latch and being shown in the valve open-coupling connected position in full lines, and the left valve handle being shown in the closed position in phantom lines.

With reference to FIG. 1 an entire coupling utilizing interconnected identical coupling parts and valve operating apparatus constructed in accord with the invention is represented at 10. The coupling 10 consists of interconnected parts 12 and 14. As the parts 12 and 14 are identical in all respects it will be appreciated that a description of a single part serves to describe both coupling parts. The advantage of identical or "unisex" coupling parts is the simplification of manufacture and inventory, and the elimination of requiring special configurations for the parts of the coupling is highly advantageous.

With particular reference to FIGS. 2-6, it will be appreciated that a coupling part, such as part 12, includes an annular housing 16 which is formed by an assembled shell 18 and an adapter 20. The housing 16 includes a flow passage generally indicated at 22 axially extending through the housing 16, and the housing includes a conduit connection end 24 at the right end, FIG. 2, and a coupling connection end 26 which is the end of the housing which will be attached to the coupling part 14.

The adapter 20 is of an annular configuration internally provided with threads 28 whereby a hose fitting, not shown, or the like may be threaded into the adapter to supply the fluid to be handled. Exteriorly, the adapter includes wrench flats 30 for receiving a wrench to control rotation of the adapter.

Internally, the adapter 20 includes a cylindrical boss 32 received within a cylindrical surface defined within the shell 18 and sealed thereto by O-ring 34. Retainer washers 36 held within grooves defined in the shell abut against the boss shoulder and maintain the assembly of the adapter 20 and shell 18.

The adapter includes an internal cylindrical bore 38 which receives the annular sleeve 40 having an inner conical surface 42 for engaging the valve as will be described later. The sleeve 40 also includes the bore 44 which defines the effective diameter of the flow passage 22. A compression spring 46 surrounding a portion of the sleeve 40 biases the sleeve toward the left, FIGS. 2-5.

The coupling parts 12 and 14 are interconnected by arcuate connector fingers 48 defined on the shell 18 and axially extending therefrom. The fingers 48 include hooks 50 and each of the coupling connection ends 26 are provided with arcuate recesses 52 for receiving the ends of the fingers 48 and the hooks 50 of the interconnected coupling part. The recesses 52 include enlarged portions for receiving the hooks 50 and constitute bayonet type recesses whereby the fingers 48 may be inserted into the recesses 52 of the aligned coupling part and relative rotation of the coupling parts firmly interconnects the parts. The interrelationship and connection between the fingers and recesses will be readily appreciated from the assignee's U.S. Pat. No. 4,438,779 which is identical thereto.

An annular seal retainer 54 is located within the shell 18 adjacent the coupling connection end 26. The retainer 54 includes a flange 56 engaging a shell interior shoulder so as to axially locate the retainer within the shell. The retainer includes a central opening 58 concentric to the flow passage axis and an interior annular seal ring 60 is mounted within the retainer 54 to provide a sealed relationship with the valve, as later described.

Exteriorly, the retainer 54 is provided with a lip seal 62 concentric to the flow passage axis and the lip seals 62 of the coupling parts 12 and 14 engage upon the coupling parts being interconnected to establish a fluid tight relationship between the parts 12 and 14.

The coupling connection end 26 is of a flat configuration defining a plane as represented by numeral 64 defined by the outer surface of the retainer 54, and it will be appreciated when the coupling parts 12 and 14 are interconnected as shown in FIG. 1 the planes 64 of the parts will be adjacent and substantially contiguous to each other.

An annular cam surface wear plate 66 is located within the retainer 54 concentric to the axis of the flow passage 22 and the purpose of the wear plate 66 will be later apparent.

The coupling part valve is generally indicated at 68. For purpose of description the valve 68 will be described as a ball valve, but as will be appreciated, surfaces defined upon the valve cause the configuration thereof to depart from that of a normal ball valve.

The valve 68 includes a diametrical bore 70 extending through the valve and of a diameter substantially equal to the sleeve bore 44. The exterior surface of the valve 68 is generally spherical, however, a flat coupling connection end seal surface 73 is defined thereon as will be appreciated from FIG. 6 and a similar flat surface 73A is formed on the opposite side of the valve. A pair of aligned cam studs 74 are mounted in the valve and extend from the exterior surface 72 for engagement with the cam wear plate 66, as later explained. Further, the exterior surface 72 of the valve is provided with a linear slot 76 having parallel sides for providing a torque transmitting connection to the valve operator.

The valve 68 is operated by a shaft 78 rotatably mounted within a radial bore 80 defined in the shell 18. The shell 18 includes a radially extending boss 81 in which the bore 80 is formed, and the shaft 78 includes an outer end 84 to which the handle 86 is attached by a bolt 88 or by a roll pin 89. The inner end of the shaft 78 is indicated at 90 and includes an elongated block or slide 92 which is closely received within the valve slot 76 in a slidable manner. Accordingly, it will be appreciated that rotation of the shaft 78 by the handle 86 will rotate the valve 68 about the axis of the shaft due to the torque transmitting interconnection between the slot 76 and the slide 92.

The handle 86 includes an outer end 94 adapted to be grasped by the operator to control the position of the valve. The handle inner end 96 includes an arcuate extension 98 which is offset inwardly with respect to the inner end 96 as will be appreciated from FIG. 6. The extension 98 is of a circular configuration substantially concentric to the axis of rotation of the associated handle 86 for reasons later described.

Figure 7:
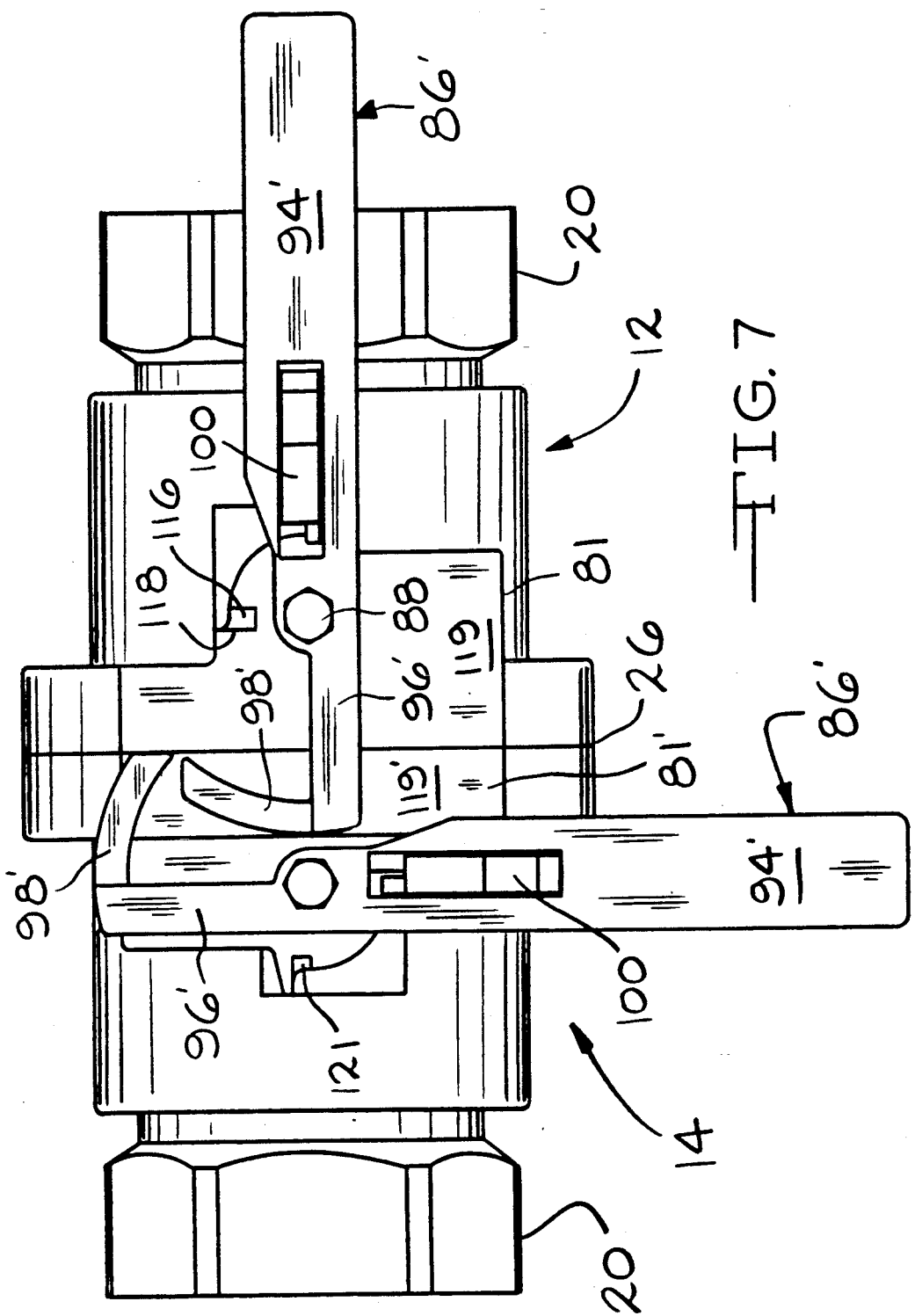
FIG. 7 is a top plan view of a coupling in accord with the invention illustrating the handle embodiment incorporating a security latch, the right valve operating handle being shown in the valve open position, and the left valve operating handle being shown in the closed position.
Figure 8:
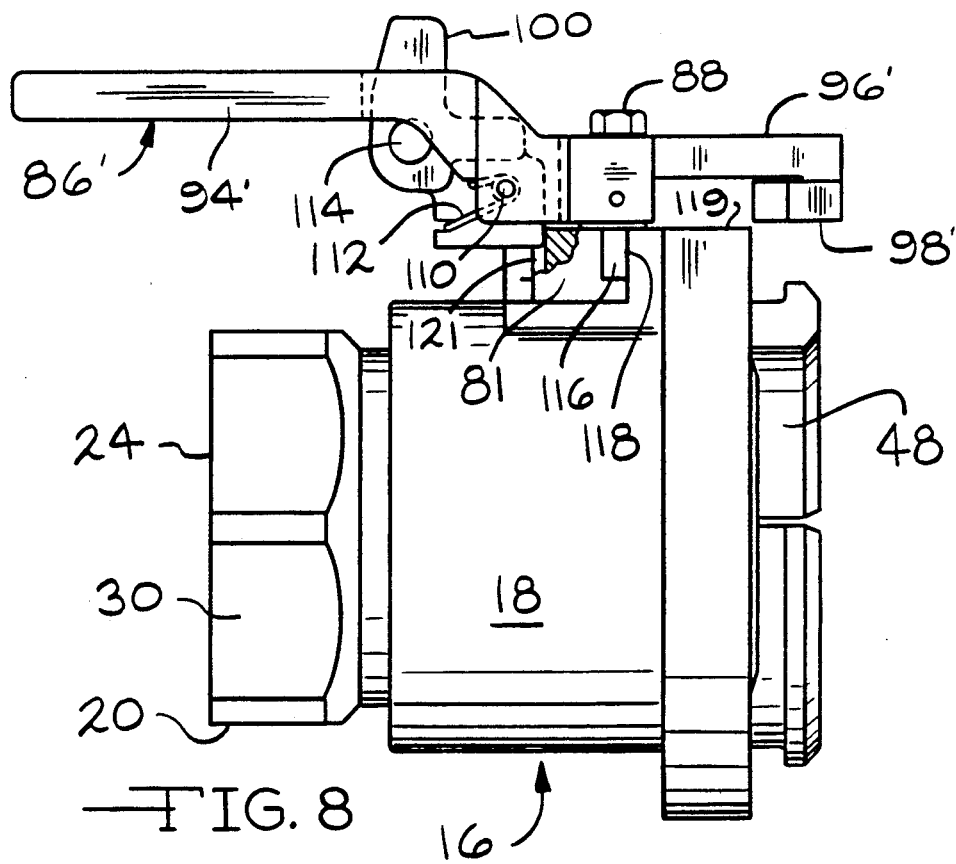
FIG. 8 is a side elevational view of a coupling part in accord with the invention illustrating the valve operating handle security latch embodiment in the valve open position.
Figure 9:
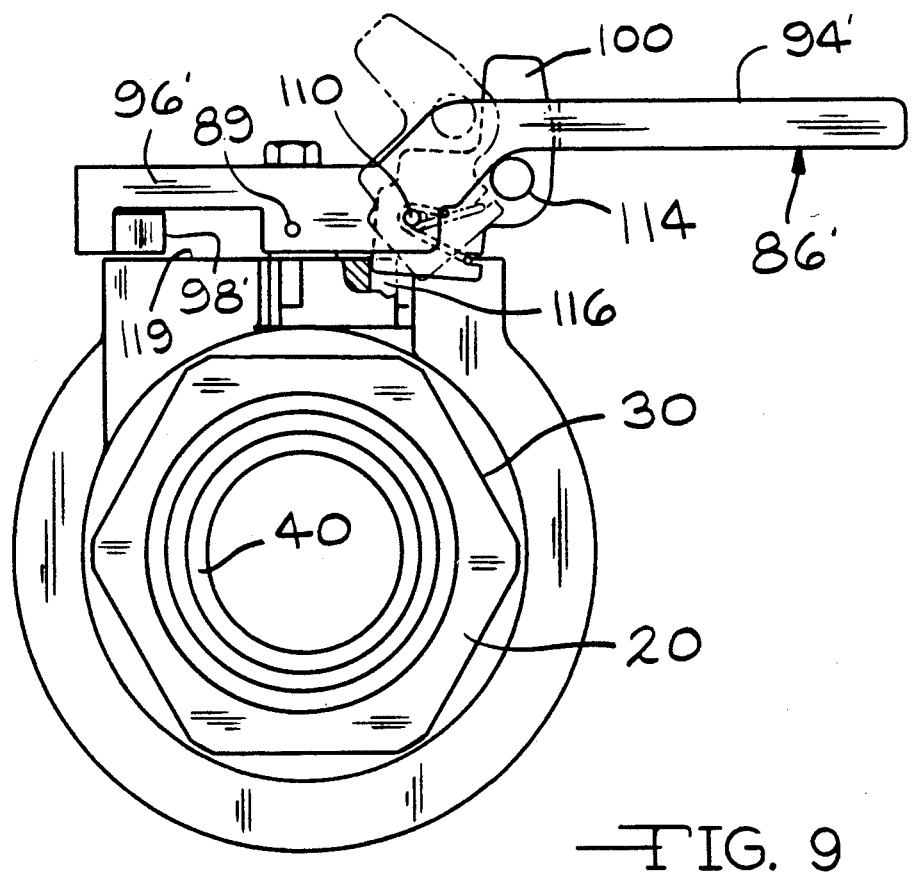
FIG. 9 is an end elevational view illustrating the valve operating handle security latch embodiment in the valve closed position.

In FIGS. 1-6 a basic form of handle 86 is illustrated and the basic operation of the coupling components will be understood with respect to the operation of handle 86. In FIGS. 7-9 a version of valve handle is illustrated which includes a security latch and the operation of this handle embodiment will be later described.

Figure 3:
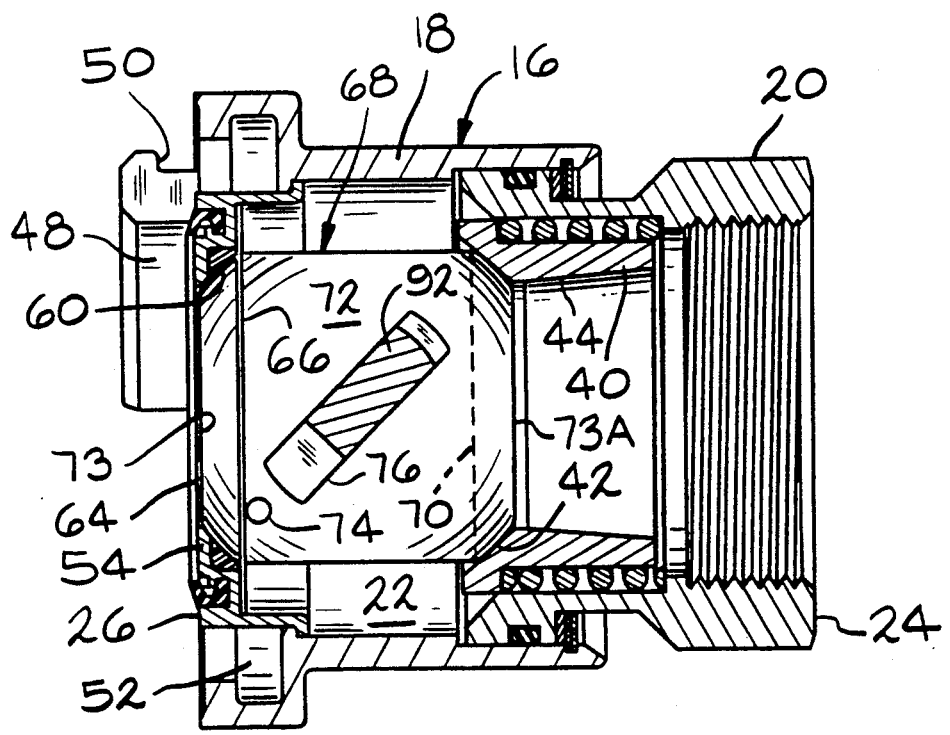
FIG. 3 is a diametrical plan sectional view taken 90° with respect to the view of FIG. 2 as along Section 3—3 illustrating the valve in elevation and in the closed position.

In operation, prior to the interconnection of the coupling parts 12 and 14, the valve 68 will normally be rotated to the off position as represented in FIG. 3. The handle 86 will be disposed at right angles to the length of the associated coupling part and the valve bore 70 will be at right angles to the flow passage 22 as shown in FIG. 3. The conical surface 42 of the sleeve 40 will be engaging the side of the valve exterior surface 72 biasing the exterior surface 72 adjacent the valve flat seal surface 73 into a fluid tight sealing relationship with the interior seal ring 60. The engagement of the valve 68 with the seal ring 60 seals the flow passage 22 through the coupling part 12 and as the coupling connection end seal surface 73 defined upon the valve exterior surface 72 is fully located within the retainer opening 58 and is substantially coplanar with the general plane 64 of the coupling connection end 26, as will be appreciated from FIG. 3, the coupling connection end 26 is substantially devoid of cavities in which fluid could be trapped. The substantially coplanar alignment of the valve surface 73 with the plane 64 produces a relatively flat coupling connection end 26 minimizing the likelihood of foreign matter being trapped on the end 26 and a clean conduit connection end may be readily maintained prior to the interconnection of the coupling parts 12 and 14.

When it is desired to interconnect the coupling part 12 and 14 the parts are aligned in the manner shown in FIGS. 1 and 7, the connector fingers 48 are inserted into the arcuate recesses 52 defined in the opposing coupling connection end 26, and the parts 12 and 14 are rotated relative to each other a few degrees to align the finger hooks 50 with the radial shoulders of the recesses 52 to establish complete interconnection of the coupling parts. The lip seals 62 will be engaging and compressing each other and a fluid tight interrelationship between the coupling parts is achieved. The above described procedure of interconnection of coupling parts is identical to that shown in the assignee's U.S. Pat. No. 4,438,779.

The valves 68 are now opened by rotating the valves by their associated handle 86. The handles 86 are rotated so that the length of the handles align with the length of the associated coupling part, as shown in FIG. 1 in full lines, such pivoting of the handles 86 causes the handle arcuate extensions 98 to pass under the handle inner end 96 of the interconnected coupling part as will be apparent from FIG. 1.

Figure 4:
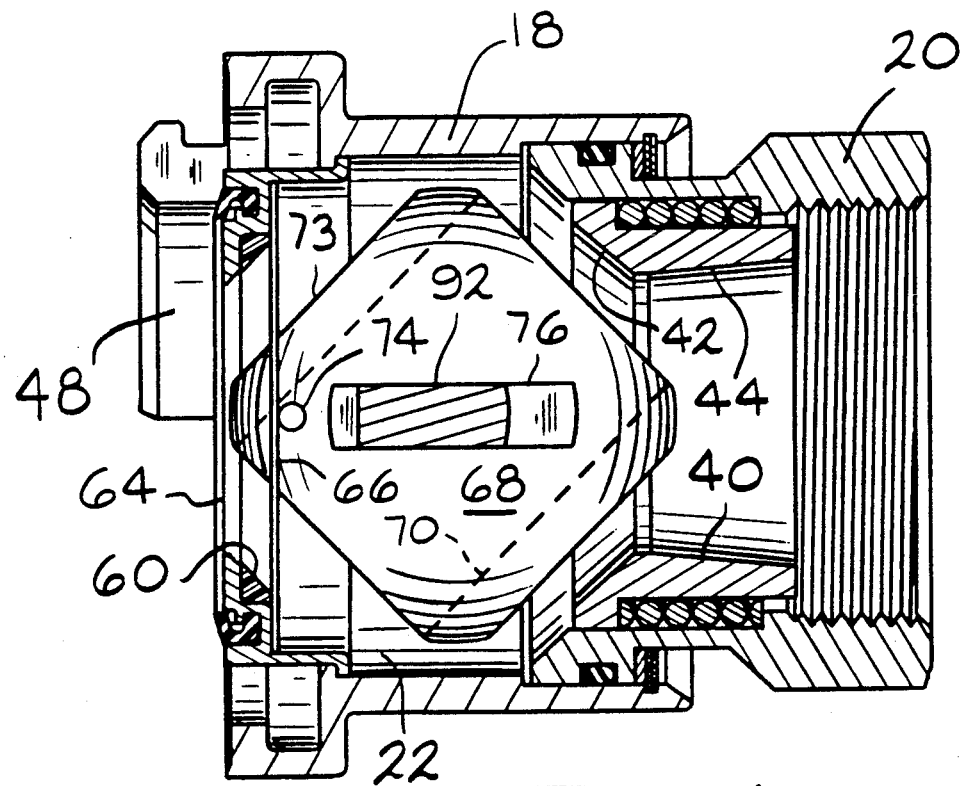
FIG. 4 is a view similar to FIG. 3 illustrating the valve halfway between the open and closed position.
Figure 5:
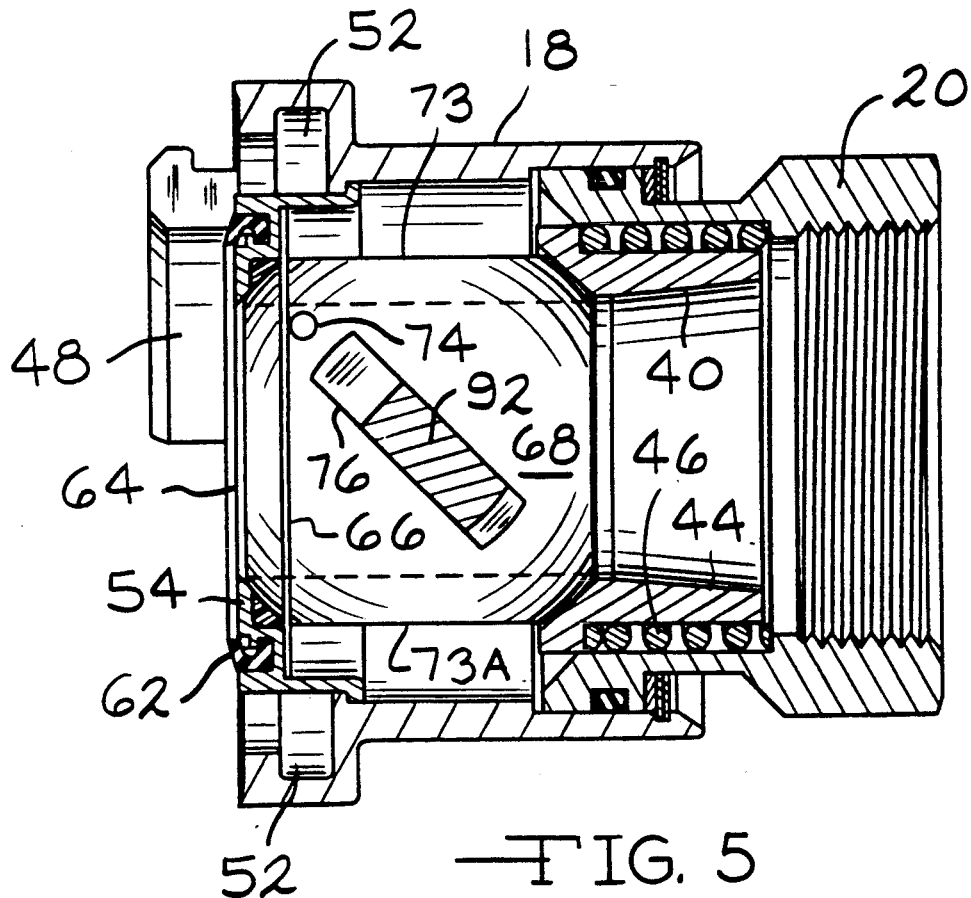
FIG. 5 is a sectional view similar to FIGS. 3 and 4 illustrating the valve in the open position.
Figure 6:
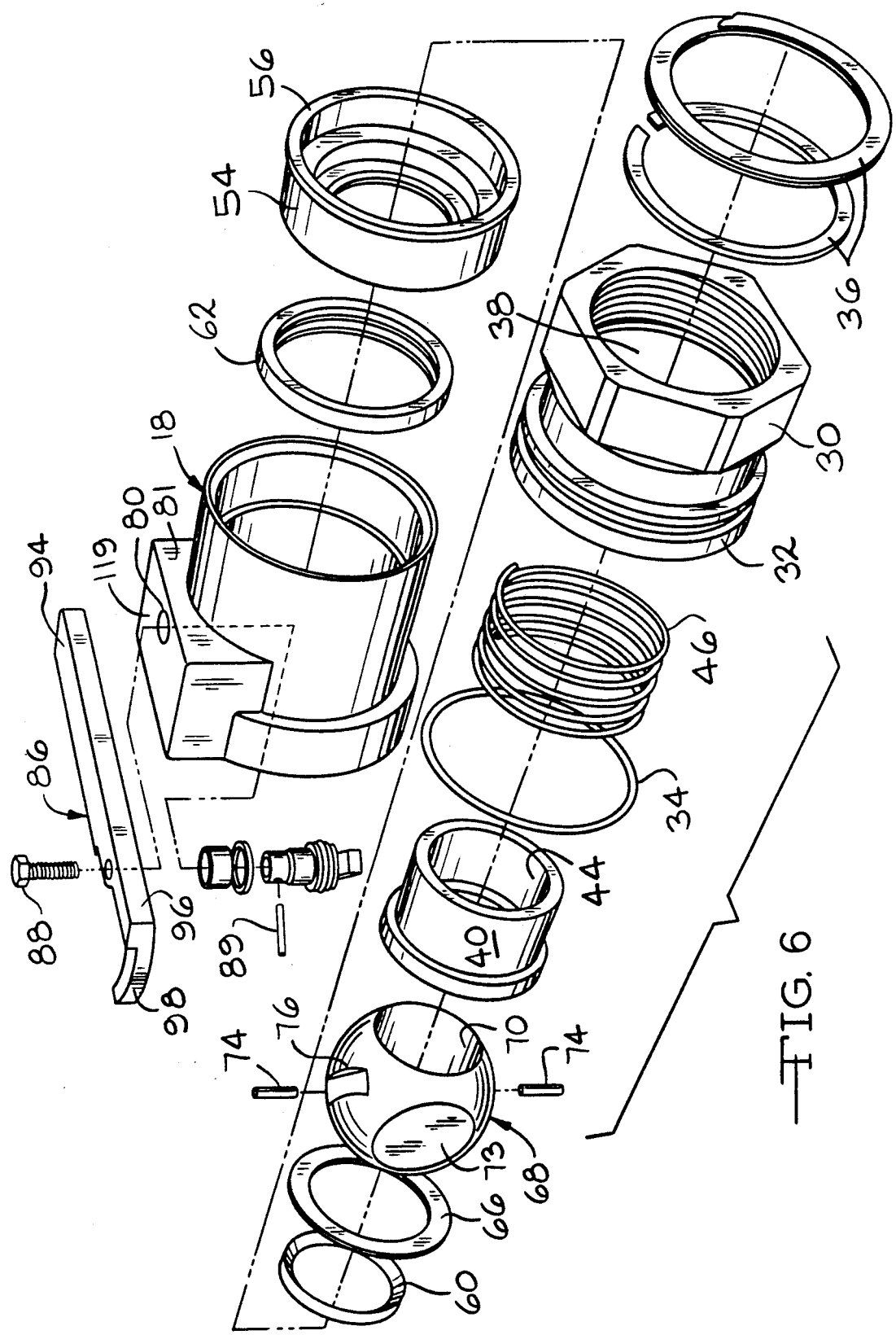
FIG. 6 is an exploded perspective view of the coupling part of FIG. 2 in accord with the invention.

When rotating the valve 68 from the closed position of FIG. 3 to the open position of FIG. 5 an axial displacement of the valve takes place which is best understood by reference to FIGS. 3-5 where the cam wear plate 66 is illustrated in a non-sectional manner. As will be appreciated from FIG. 3, when the valve 68 is in the closed position the cam studs 74 will be engaging the cam wear plate 66 below the centerline of the flow passage 22. As the valve 68 is rotated in a clockwise direction, FIG. 4, the cam studs 74 will move across the wear plate 66, and in FIG. 4 a half open and closed relationship is shown. In the relationship shown in FIG. 4 portions of the valve exterior surface 72 are still engaged by the sleeve conical surface 42 and the cam studs 74 will be maintained in engagement with the wear plate 66. However, as the valve 68 is rotated the engagement of the cam studs 74 with the plate 66 causes the valve 68, and its axis of rotation, to move to the right, FIG. 4. Such axial displacement of the valve 68 in the axial direction of the flow passage 22 compresses spring 46 and causes the slot 76 to be displaced relative to the shaft slide 92, as will be appreciated from FIG. 4.

The purpose of this axial displacement of the valve 68 is to prevent any portion of the valve 68 from axially extending beyond the general plane 64 of the coupling connection end during operation. Thus, interference with the interconnected coupling part is prevented and the valve 68 may freely rotate from the closed to the open position.

Figure 2:
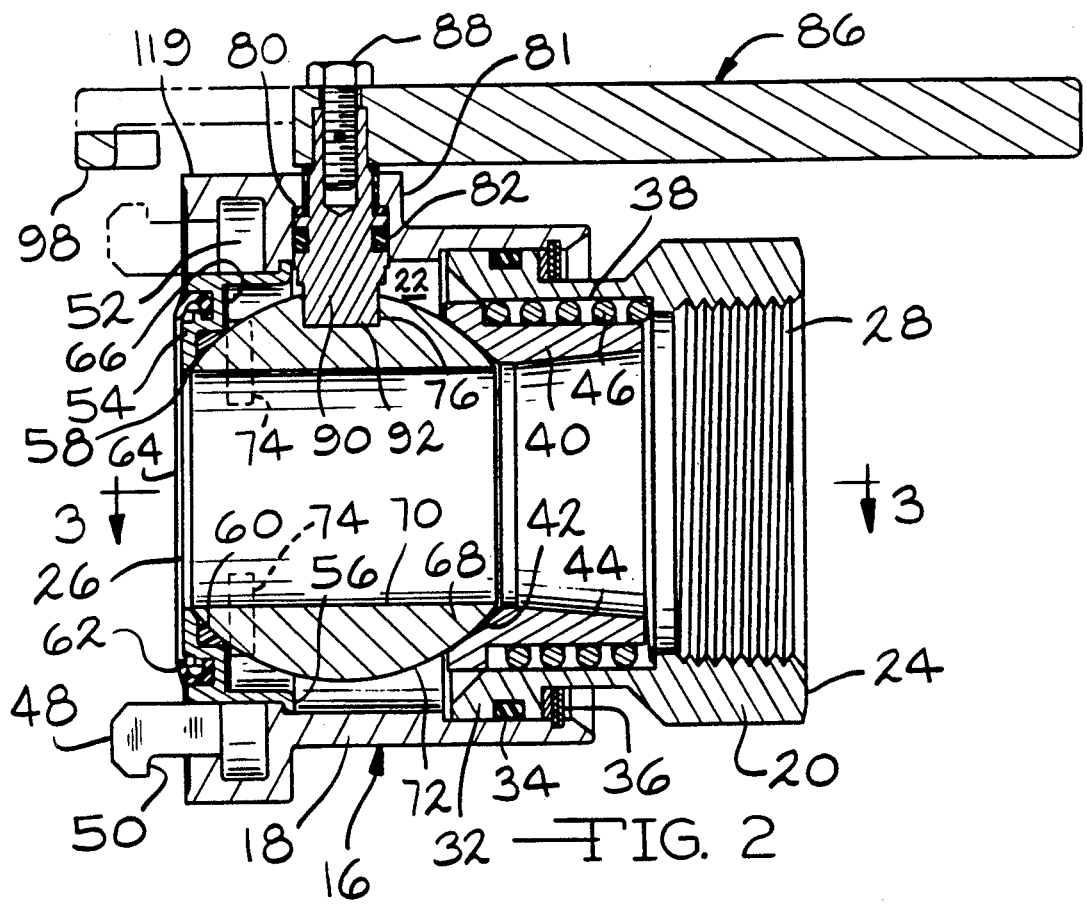
FIG. 2 is a diametrical elevational sectional view of a coupling part in accord with the invention utilizing the basic handle, the valve being shown in the open position.

FIG. 5 illustrates the position of the valve 68 when fully opened, as also shown in FIG. 2. In this position the cam studs 74 will be located above the axis of the flow passage 22, the shaft slide 92 will be located within the valve slot 76 as shown, and the slot 76 will have rotated 90° from the position shown in FIG. 3. The alignment of the valve bore 70 with the retainer opening 58 permits the sleeve 40 to bias the valve 68 into engagement with the interior seal ring 60 again establishing a sealed relationship between the valve and the seal ring 60. With both valves 68 open fluid flow through the coupling 10 occurs and high flow capacity with low pressure loss is achieved in view of the valve bore 70 having a diameter substantially as large as the smallest diameter in the coupling part passage, i.e. the sleeve bore 44.

When it is desired to disconnect the coupling parts 12 and 14 both handles 86 must be disposed at right angles to the length of the coupling parts to rotate the valves 68 to their closed positions. As the handle extensions 98 of each handle 86 extend over the boss 81 of the interconnected part when the handles are rotated to open valves 68, and as the clearance between the adjacent boss surface 119, and the superimposed extension 98 is close, the extensions 98 and boss surfaces 119 will prevent relative rotation of the coupling parts 12 and 14 when the valves are open as shown in FIG. 1. Thus, it will be appreciated that the boss surfaces 119 comprise interference surfaces with respect to the handle inner ends 96 and the extensions 98, and when the parts 12 and 14 are fully connected the surfaces 119 are parallel to the plane of rotation of the handles 86. The length of the arc of the extensions 98 is sufficient to interfere with the adjacent surface 119 until the valves 68 are substantially fully closed.

In FIG. 1 the handle 86 of the coupling part 14 shown in phantom lines has been pivoted to the closed position, and as such the extension 98 will clear the surface 119 of the boss 81 of the coupling part 12. However, the parts 12 and 14 cannot be relatively rotated until the extension 98 is removed from its superimposed position over the surface 119 of the boss 81 of the coupling part 14, and upon such occurrence the parts 12 and 14 can be relatively rotated to remove the connector fingers 48 from the associated recesses 52 and permit the parts 12 and 14 to be disconnected and separated.

In the rotation of the handles 86 from the open position of FIG. 5 to the closed position of FIG. 3 the valve cam studs 74 will again move across the cam surface wear plate 66 and axially translate the valve 68 inwardly with respect to the plane 64. Accordingly, the axial displacement of the valve prevents interference of the valve operation from the interconnected coupling part components. Once the valve 68 is fully closed as shown in FIG. 3, the valve coupling connection end seal surface 73 will be fully received within the retainer central opening 58 substantially coplanar with the plane 64 eliminating the presence of cavities or voids in which fluid may be trapped which could escape to the atmosphere or ground upon separation of the coupling parts 12 and 14.

It is to be appreciated that because the diameter of the valve bore 70 is large as compared to the diameter of the valve exterior 72 that it would not be possible to achieve the aforedescribed relationship of components to minimize trapped fluid without the axial displacement of the valve. Without the axial displacement of the valve the exterior surface of the valve would pass through the plane 64 as the valve is being rotated between its open and closed positions as represented in FIG. 4. However, the axial displacement of the valve as it rotates between its operative positions assures that the valve will be confined behind the associated plane 64 and no interference between coupling parts can occur during valve operation when the parts are connected.

In FIGS. 1-6 the valve operating handle 86 is of a flat configuration and no apparatus is associated with the handle for locking the valve handle in the valve closed position. In FIGS. 7-9 a security locking latch is illustrated as mounted upon the valve operating handle and in these figures handle components similar to those previously described are indicated by primed reference numerals.

The handle portion 94' is outwardly offset and a locking latch 100 is pivotally mounted upon the handle 86' within a slot by a pivot 110 wherein the latch may pivot in a plane perpendicular to the length of the handle 86'. A spring 112 disposed about the pivot 110 biases the locking latch in a clockwise direction as shown in FIG. 9 and the latch includes a hole 114 adapted to selectively receive a padlock shackle if the handle 86' is in the valve closed position. The shell boss 81' is formed with a notch 116 and stop 118 adapted to cooperate with and receive the latch 100 when the handle 86' is in the valve closed position. When the handle 86' is in the position shown in full lines at the left of FIG. 7, and in FIG. 9, wherein the length of the handle is at right angles to the axis of the flow passage, the latch 100 pivots into the notch 116 which is deep enough to permit the locking latch to move toward boss 81' far enough to expose the entire circumference of the hole 114 below handle portion 94', FIG. 9, permitting a padlock shackle, not shown, to be inserted therethrough. In this manner the handle 86' can be locked in the valve closed position. When the handle 86' is rotated to the open position as shown at the right in FIG. 7, and in FIG. 8, the latch 100 is in alignment with the boss notch 121 and as notch 121 is not as deep as notch 116 the latch 100 cannot pivot sufficiently below the handle outer portion 94' to completely expose the padlock shackle hole 114, as shown in FIG. 8, so as to receive a padlock shackle. Accordingly, while the notch 121 acts as a valve open detent it is not possible to lock the coupling part valves in the open position.

Figure 10:
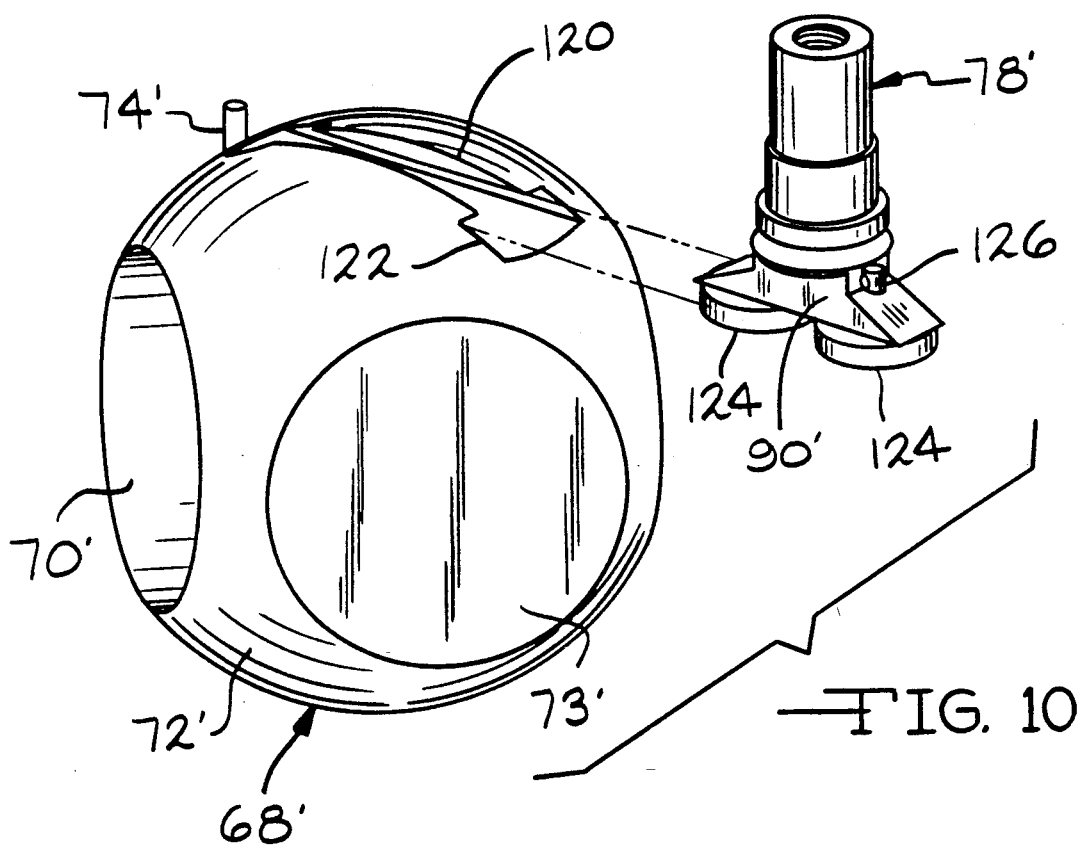
FIG. 10 is an enlarged perspective view illustrating the valve and valve operating shaft utilizing an anti-friction slide.

Frictional forces between the valve slot 76 and the shaft slide 92 can become high during rotation of the valve 68, and such frictional forces are reduced if the slide 92 is formed of a self-lubricating material such as nylon, or the valve 68 itself is formed of a self-lubricating synthetic plastic. Another manner for reducing the frictional forces between the valve and its actuating shaft is shown in FIG. 10. In FIG. 10 similar components to those previously described are represented by primed reference numerals.

The valve 68' includes the bore 70' having an exterior surface 72'. The flat sealing surface 73' is defined upon the exterior surface 72' as previously described, and cam studs 74' extend from the valve 68'.

The slot formed on the valve 68' is shown at 120 and is of a T-slot configuration including an undercut 122. The valve operating shaft 78' includes the inner end 90' and anti-friction rollers 124 are mounted upon the shaft inner end 90' for rotation about roller shafts 126. The rollers 124 are received within the slot undercut 122 and in this manner an anti-friction interrelationship between the shaft 78' and the valve 68' is achieved.

It will be appreciated that various modifications to the inventive concepts may be apparent to those skilled in the art without departing from the spirit and scope of the invention.

We claim:

1. In a fluid coupling comprising first and second identical interconnected parts, each of the parts including a tubular housing having an axis, an exterior surface, an axial flow passage, a coupling connection end and a conduit connection end intersected by the flow passage, a valve rotatably mounted in each part flow passage controlling fluid flow therethrough and selectively positionable between open and closed positions, an exterior handle operatively connected to each valve for rotation in an operative plane for rotating the associated valve between its positions, and mutually interconnectable connectors mounted upon the coupling connection end of each of the parts' housings adapted to selectively coaxially interconnect the housings, the connectors adapted to engage and release from each other upon relative rotatable movement about the coaxial housing axes, the improvement comprising, identical handle interference portions defined on each of the housings' exterior surfaces, identical extensions defined on each of the exterior valve operating handles adapted to be disposed adjacent the interference portion of the connected housing in an interfering relationship thereto when the parts are fully interconnected and the handles are rotated to the valve open position upon attempted relative rotation of the housings about their axes to disconnect the connectors, rotation of the handles to the valve closed position removing said handles' extensions from an interfering relationship with the adjacent housing interference portion permitting relative rotation of the housings about their axes to disconnect the connectors and separate the coupling parts.

2. In a fluid coupling as in claim 1, said housings' handle interference portions being defined on the associated housing exterior surface adjacent the housing coupling connection end.

3. In a fluid coupling as in claim 2, a boss defined on each housing exterior surface adjacent the associated housing coupling connection end, said housing interference portion being defined upon said boss.

4. In a fluid coupling as in claim 3, said housing interference portions comprising a substantially flat surface defined on the associated boss radially spaced from the associated housing axis and substantially parallel to the operative plane of rotation of the associated handle.

5. In a fluid coupling as in claim 1, the valve operating handles each including an inner end, said inner ends extending over said housing exterior surface interference portion of the connected housing upon the housings being connected and the valves rotated to the open position, said handles' extensions being mounted upon said handles' inner ends.

6. In a fluid coupling as in claim 5, said handles' extensions being of an elongated arcuate configuration so as to remain in an interfering relationship with said interfering portion of the connected housing until the associated valve is fully closed.

7. In a fluid coupling as in claim 6, said handles' extensions being of a circular configuration concentric to the axis of rotation of the associated handle.

8. In a fluid coupling comprising first and second interconnected parts, each of the parts including a tubular housing having an axis, an exterior surface, an axial flow passage, a coupling connection end and a conduit connection end intersected by the flow passage, a valve rotatably mounted in each part flow passage controlling fluid flow therethrough and selectively positionable between open and closed positions, an exterior handle operatively connected to each valve for rotation in an operative plane for rotating the associated valve between its positions, and mutually interconnectable connectors mounted upon the coupling connection end of each of the parts' housings adapted to selectively coaxially interconnect the housings, the connectors adapted to engage and release from each other upon relative rotatable movement about the coaxial housing axes, the improvement comprising, handle interference portions defined on each of the housings' exterior surfaces, extensions defined on each of the exterior valve operating handles adapted to be disposed adjacent the interference portion of the connected housing in an interfering relationship thereto when the parts are fully interconnected and the handles are rotated to the valve open position upon attempted relative rotation of the housings about their axes to disconnect the connectors, rotation of the handles to the valve closed position removing said handles' extensions from an interfering relationship with the adjacent housing interference portion permitting relative rotation of the housing about their axes to disconnect the connectors and separate the coupling parts, a latch mounted upon each valve operating handle movable between handle locking and handle release positions, latch receiving means defined upon the associated housing exterior surface receiving said latch in its handle locking position upon the associated handle being in the valve closed position, latch locking means defined on said latch selectively permitting locking of said latch in said handle locking position, and means rendering said latch locking means inoperative when the associated handle is in the valve open position.

9. In a fluid coupling as in claim 8, spring means biasing said latch toward said handle locking position.

10. In a fluid coupling as in claim 8, said latch receiving means and said means rendering said latch locking means inoperative comprising first and second notches, respectively, defined upon the associated housing exterior surface selectively receiving said latch, said first notch having a greater depth than said second notch whereby said latch locking means is rendered inoperative when said latch is received within said second notch.

11. In a fluid coupling comprising first and second interconnected parts, each of the parts including a tubular housing having an axis, an exterior surface, an axial flow passage, a coupling connection end and a conduit connection end intersected by the flow passage, a valve rotatably mounted in each part flow passage controlling fluid flow therethrough and selectively positionable between open and closed positions, an exterior handle operatively connected to each valve for rotation in an operative plane for rotating the associated valve between its positions, and mutually interconnectable connectors mounted upon the coupling connection end of each of the parts' housings adapted to selectively coaxially interconnect the housings, the connectors adapted to engage and release from each other upon relative rotatable movement about the coaxial housing axes, the improvement comprising, handle interference portions defined on each of the housings' exterior surfaces, extensions defined on each of the exterior valve operating handles adapted to be disposed adjacent the interference portion of the connected housing in an interfering relationship thereto when the parts are fully interconnected and the handles are rotated to the valve open position upon attempted relative rotation of the housings about their axes to disconnect the connectors, rotation of the handles to the valve closed position removing said handles' extensions from an interfering relationship with the adjacent housing interference portion permitting relative rotation of the housings about their axes to disconnect the connectors and separate the coupling parts, the valve operating handles each including an outer end adapted to be manually grasped and an inner end, said inner end extending over said housing exterior surface interference portion of the connected housing upon the housings being connected and the valves rotated to the open position, said handles' extensions being mounted upon said handles' inner ends and being of an elongated arcuate configuration so as to remain in an interfering relationship with said interfering portion of the connected housing until the associated valve is fully closed.

12. In a fluid coupling as in claim 11, said handles' extensions being of a circular configuration concentric to the axis of rotation of the associated handle.

* * * * *